May 17, 1960

R. P. SAUNDERS 2,936,671

PHOTOGRAPHIC EASEL

Filed May 9, 1958

ROBERT P. SAUNDERS
INVENTOR.

BY
Harold E. Stonebraker
his ATTORNEY

May 17, 1960
R. P. SAUNDERS
2,936,671
PHOTOGRAPHIC EASEL
Filed May 9, 1958
6 Sheets-Sheet 2
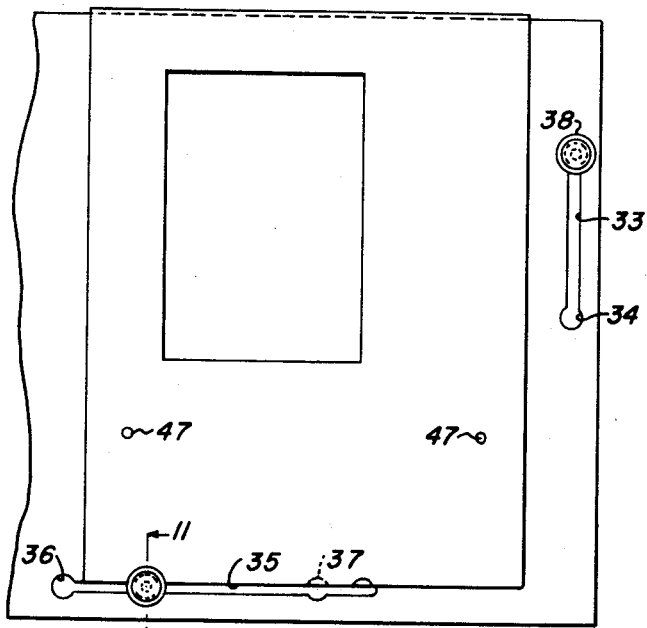
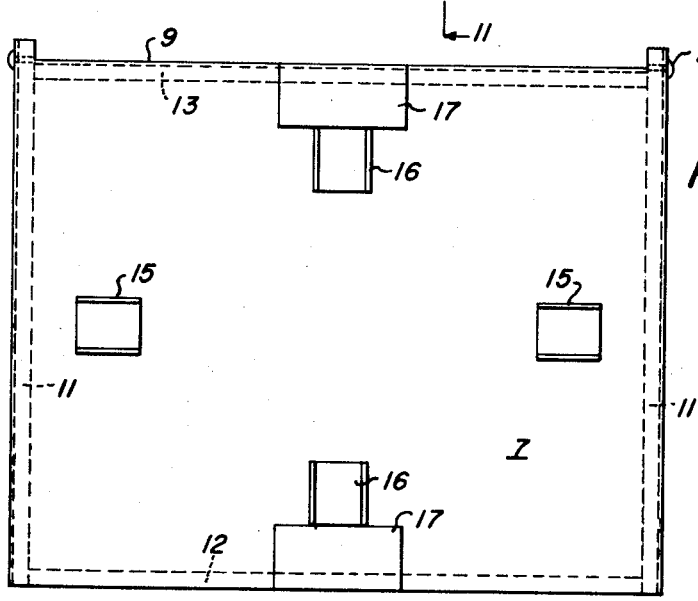
ROBERT P. SAUNDERS
INVENTOR.
BY Harold E. Stonebraker
his ATTORNEY May 17, 1960  R. P. SAUNDERS  2,936,671
PHOTOGRAPHIC EASEL
Filed May 9, 1958  6 Sheets-Sheet 3

ROBERT P. SAUNDERS
INVENTOR.

BY
Harold E. Stonebraker
his ATTORNEY

May 17, 1960 R. P. SAUNDERS 2,936,671
PHOTOGRAPHIC EASEL
Filed May 9, 1958 6 Sheets-Sheet 4
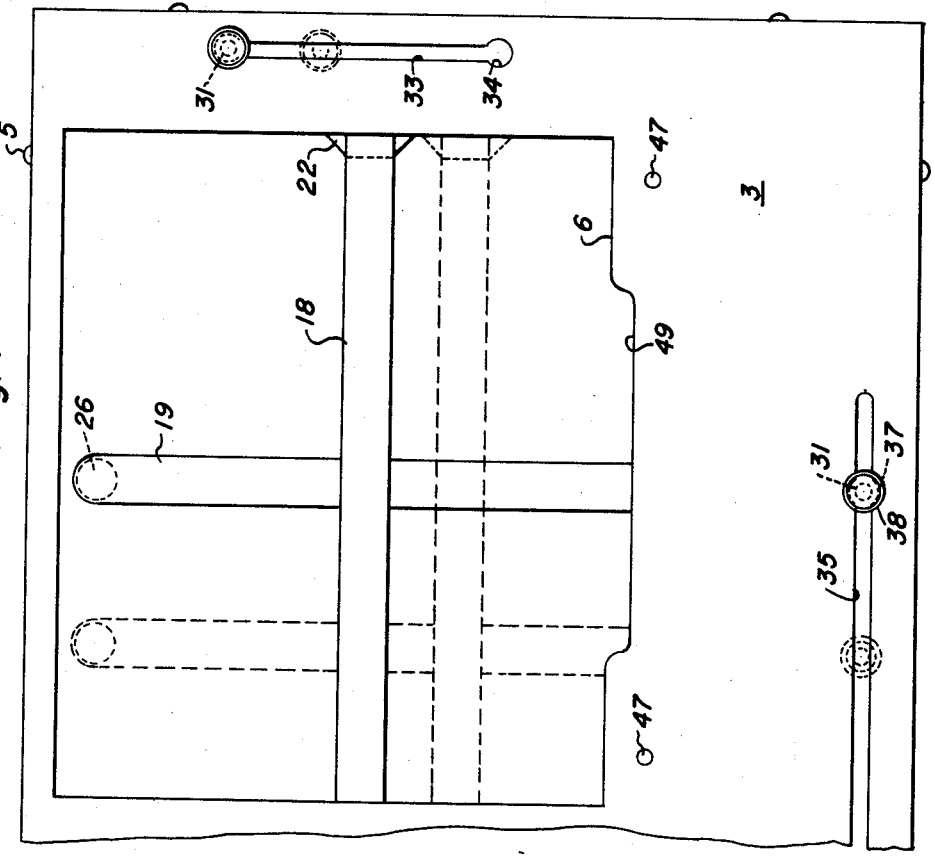
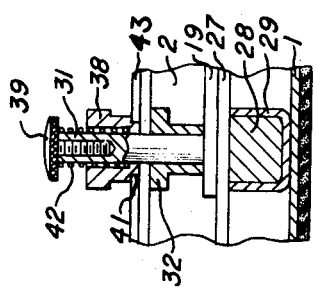
ROBERT P. SAUNDERS
INVENTOR.
BY Harold E. Stonebraker
his ATTORNEY

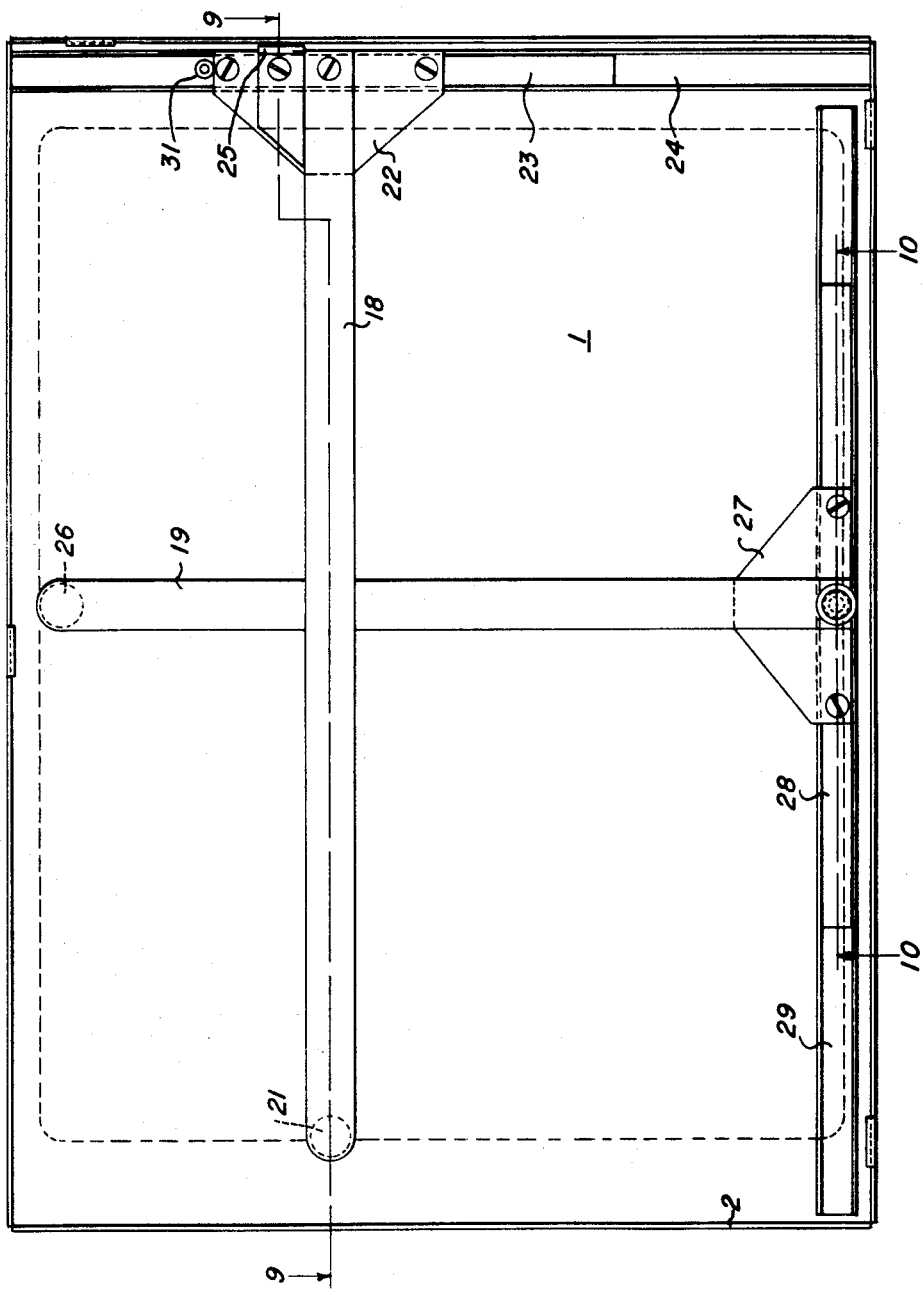

May 17, 1960

R. P. SAUNDERS 2,936,671

PHOTOGRAPHIC EASEL

Filed May 9, 1958

ROBERT P. SAUNDERS
INVENTOR.

BY
Harold E. Stonebraker
his ATTORNEY

United States Patent Office 2,936,671
Patented May 17, 1960

2,936,671

PHOTOGRAPHIC EASEL

Robert P. Saunders, Rochester, N.Y.

Application May 9, 1958, Serial No. 734,330

1 Claim. (Cl. 88—24)

This invention relates to a photographic easel for printing pictures, more particularly color pictures, although useful also in making black and white prints, and has for its purpose to afford a light weight structure of low manufacturing cost which can be easily controlled in a dark room, and is especially suitable for use by amateur photographers who require automatic positioning means for the paper and masks.

In a more particular aspect, the invention is intended to afford an easel adapted for use with 8" x 10" photographic paper and which can be readily operated to produce one 8" x 10" print, or two 5" x 7" prints, or four 4" x 5" prints, or four 3½" x 5" prints, or eight 2½" x 3½" prints, on a single sheet of 8" x 10" paper, and the paper automatically positioned for printing the selected number of prints.

Another object of the invention is to provide a series of masks, each having a size of exposure opening corresponding to the size of the print to be produced, each mask being positionable on the easel and held in predetermined relation to the paper which is movable with its carrier to different positions depending upon the size of the print to be made, the mask functioning to locate the position of the paper carrier automatically as the latter is moved prior to each exposure, in order to produce the required number of prints on the 8" x 10" sheet, and it is a further purpose to enable positioning the selected removable mask on the easel accurately in a dark room and moving the paper carrier and paper to predetermined positions determined by the mask. For instance, for printing a single picture on the 8" x 10" paper, no movement of the paper and paper carrier is required. For making two 5" x 7" prints, one mask would have a corresponding exposure opening, and when positioned on the easel, would permit movement of the paper carrier to two positions. A second mask would have an exposure opening corresponding to a 4" x 5" print, and when positioned on the easel would permit movement of the paper carrier to four positions in order to produce four prints on the 8" x 10" sheet. Another mask would have an exposure opening corresponding to a 3½" x 5" print, and when positioned on the easel would permit movement of the paper carrier and paper to four corresponding positions, and another mask would have an exposure opening corresponding to a 2½" x 3½" print, and when positioned on the easel would permit movement of the paper carrier and paper to eight positions to produce eight prints on the 8" x 10" paper.

A further purpose of the invention is to provide a construction that enables inserting and removing the 8" x 10" paper sheet and paper carrier into and from a housing, selecting and positioning a particular mask on the housing, and moving the paper carrier and paper in relation to the exposure opening in the mask in a dark room, and eliminating the necessity for any calculations or measurements, the paper carrier being easily moved and its correct positioning being automatically determined.

Another purpose of the invention is to provide simple and practical means whereby the paper carrier on which the 8" x 10" paper sheet is mounted, is movable in two directions perpendicularly to each other, in order to enable producing any number of prints on different parts of the paper sheet, depending on the masks and mask openings available.

Still an additional object of the invention is to afford a novel and efficient mechanism embodying a pair of positioning blades arranged one above the other in perpendicular relation, and each movable bodily longitudinally of the other, in conjunction with a paper carrier on which the 8" x 10" sheet of paper is held, and provided on its bottom surface with two pairs of guides, each of said pairs of guides being engageable on one of the aforementioned positioning blades and slidable thereon, whereby the paper carrier can be moved with either of the positioning blades while sliding upon the other of said positioning blades, so that the paper carrier is positionable in any location within the limits of the positioning blades, thus enabling the paper to be moved to bring any portion of the sheet into printing relation with the exposure opening of the selected mask.

To these and other ends the invention consists in the construction and arrangement of parts that will appear clearly from the following description, when read in conjunction with the accompanying drawings, the novel features being pointed out in the claim following the specification.

In the drawings:

Fig. 2 is a similar view with the mask containing an exposure opening for a 5" x 7" print in position, and the paper carrier adjusted to print on half of the 8" x 10" sheet when exposed, following which the paper can be moved to expose the other half of the sheet for printing;

Fig. 7 is a plan view of the easel with the paper carrier removed, illustrating in full lines the positioning blades located to receive the paper carrier in its initial position, and in dotted lines an adjusted position;

Fig. 8 is a plan view of the positioning blades with the spring controlled locking members and cover removed;

Fig. 11 is a detailed sectional view on line 11—11 of Fig. 2;

Fig. 12 is a bottom plan view of the paper carrier;

Figure 1:
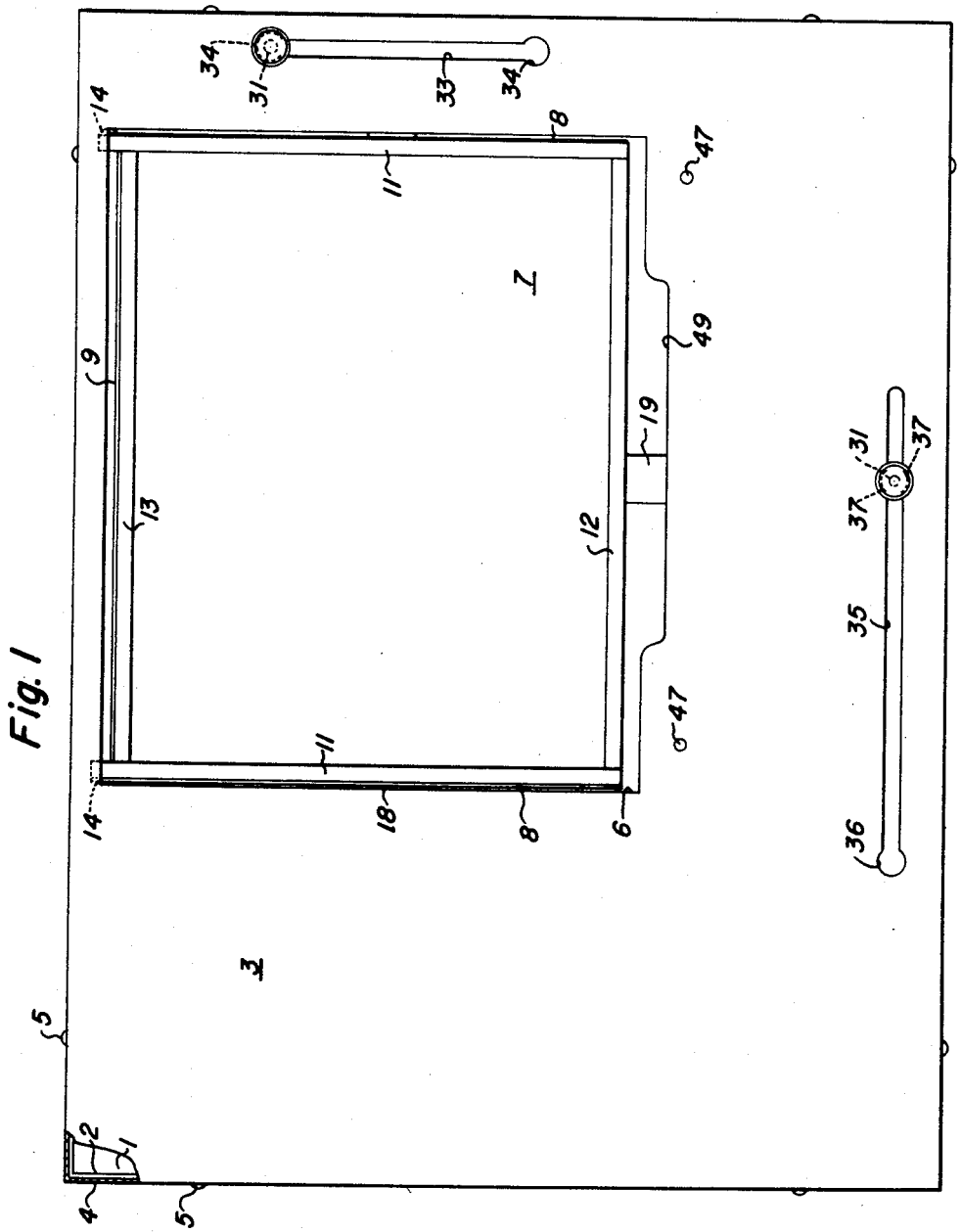
Fig. 1 is a plan view of one embodiment of the invention illustrating the paper carrier in initial position preparatory to printing a single picture on a full 8" x 10" sheet of paper.
Figure 5:
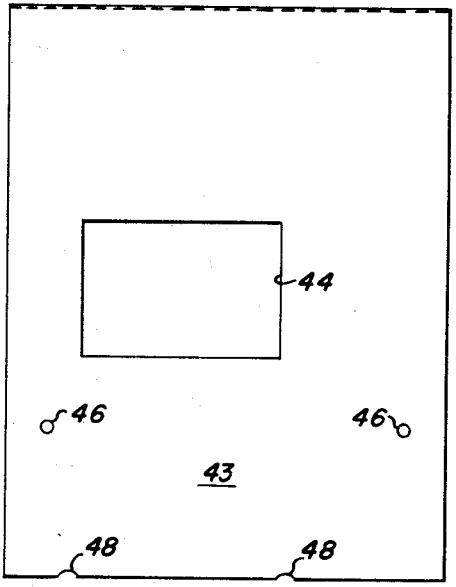
Fig. 5 is a similar view of a mask having an exposure opening for printing 3½" x 5" prints.
Figure 4:
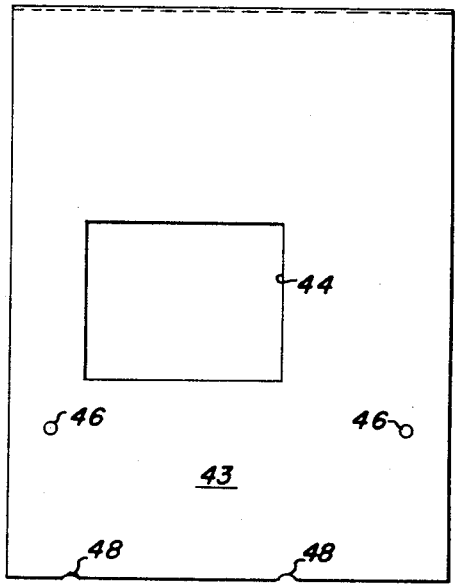
Fig. 4 is a similar view of a mask with an exposure opening for making 4" x 5" prints.

Referring more particularly to the drawings in which like reference numerals refer to the same parts throughout the several views, the invention is illustrated in a preferred embodiment which includes a housing including a bottom 1 and side walls 2, while 3 designates the top of a cover including side walls 4 that lie adjacent to the side walls 2 and are attached thereto in any suitable way as by screws 5.

The cover includes an opening 6, see Fig. 1, which is of a size sufficient to receive the paper carrier upon which a sheet of 8" x 10" photographic paper can be positioned for making prints, the paper carrier being movable in two directions perpendicularly to each other whereby one sheet of 8" x 10" paper may be utilized for making one 8" x 10" print, two 5" x 7" prints, four 4" x 5" prints, four 3½" x 5" or eight 2½ x 3½" prints in the manner that will be described presently.

The paper carrier comprises a plate or base 7 having upstanding side flanges 8 and a rear flange 9 that is cut away at its ends to receive the side bars 11 of a retaining frame including front and rear bars 12 and 13 respectively, the side bars being pivoted to the side flanges at 14 whereby the frame can be swung away from the base to remove or position the paper. When resting on the paper to hold it on the base 7, the rear bar 13 lies immediately adjacent to the rear flange 9 of the base.

The base 7 of the paper carrier has secured to its under side two pairs of guides or depending flanges, one pair being indicated at 15 and arranged in spaced relation along the longitudinal axis of the base, while the other pair is indicated at 16 and arranged along the transverse axis of the base in spaced relation. The guides 15 and 16 are adapted when in operative position to slidably engage and rest upon the positioning blades which are arranged in the housing, one above the other, in adjacent perpendicular relation, the positioning blades being each movable bodily in a direction endwise of the other positioning blade, and acting when so moved to effect corresponding movement of the paper carrier which is thus operable to expose at one time ½, ¼ or ⅛ of the paper carrier, and thus to make two, four, or eight prints on one sheet of 8" x 10" paper, as determined by a series of masks which automatically locate the paper carrier when the operator moves the same.

17 designates blocks on the lower surface of the base 7 acting to elevate the paper carrier above the underlying positioning blade sufficiently to compensate for the thickness of the overlying positioning blade, so that the paper carrier is held in level relationship on the positioning blades which extend perpendicularly to each other. The upper or overlying positioning blade is designated at 18 extends longitudinally of the housing, while 19 designates the lower positioning blade which extends transversely of the housing and beneath the upper blade 18, in contact therewith. The mounting and operating means for the positioning blades will now be described in detail.

Referring to Fig. 8, the upper positioning blade 18 carries a bumper 21 at its free end which rests upon the bottom of the housing, while its other end is secured to a supporting plate 22 which is attached to an elongated shoe or bar 23 that is slidable in a track or guideway 24 extending across one end of the housing adjacent to the end wall, the shoe 23 and positioning blade 18 being thus movable bodily in the guideway 24, while 25 designates an upstanding flange secured to the supporting plate 22 and arranged to abut against the cover of the housing and prevent upward movement of the positioning blade when the cover is attached to the base.

The lower positioning blade 19 is similarly provided at its free end with a bumper 26 and attached at its opposite end to a supporting plate 27 which in turn is secured to a bar or shoe 28 that is slidable in a guideway or track 29 attached to the bottom of the housing and extending endwise of the housing from one end thereof to a point adjacent to the track 24. The supporting plate 27 and attached positioning blade are movable bodily endwise of the housing and of the perpendicularly disposed overlying positioning blade 18. Thus each positioning blade is movable bodily endwise of the other positioning blade to any selected position, and the paper carrier being slidably attached to both positioning blades can be moved in either of two directions perpendicular to each other and thus positioned selectively at any point in relation to the opening in the cover. The paper carrier can be removed from the positioning blades when necessary.

For operating the positioning blades, each shoe or bar on which the positioning blades are mounted is provided with an upstanding tubular pin 31 that is interiorly threaded at its upper end and rigidly attached to the positioning blade and slidable shoe. 32 designates a collar mounted upon the pin 31 of the lower or underlying positioning blade and engageable with the cover of the housing when the latter is attached, and acting to prevent elevating movement of the lower positioning blade. The means for operating the positioning blades and the manner in which they are controlled will now be described in more detail.

The upstanding pin 31 of the upper positioning blade extends through a slot 33 in the cover which has a circular enlargement 34 at each end, while the pin attached to the lower positioning blade extends through a slot 35 which has a circular enlargement 36 at one end and notches or curved recesses 37 spaced from its opposite end affording a circular opening for a purpose that will appear presently. 38 designates a collar slidable vertically on the pin 31 and yieldably held in place by a retaining screw 39 that engages the interiorly threaded upper end of the pin and a spring surrounding the retaining screw and arranged between the head of the retaining screw and a shoulder within the collar. The collar includes a cylindrical portion 41 which is of a size to permit it to drop into the circular recesses or enlarged openings in the slot 33 or 35, the collar being held therein by the spring 42. To move one or the other of the positioning blades, the spring locking collar is elevated from the enlarged opening in which it is located, and the pin and positioning blade can then be moved by the operator engaging the collar and pushing it endwise of its slot.

It is desirable that the paper carrier be controlled in such a way that the operator can move it to the required position for any selected size of print and accomplish this in a dark room, and the manner in which this objective is attained will now be described.

For the purpose of making the four sizes of prints described above, there are provided four masks which are removable, and selectively positionable on the top of the housing in proper relation to the exposure opening in the housing. Each mask consists of a plate 43 having an opening 44 therein corresponding to the size of the print to be made. The plate 43 has a flange 45 at one end which enables positioning the mask in the dark by bringing the flange against the upper side wall of the housing, while 46 designates openings in the mask which drop over and engage pins 47 extending upwardly from the top of the cover. Thus by grasping a mask and bringing the flange 45 against the top side wall of the housing and moving the mask on the housing until the openings 46 engage pins 47, the mask is in position to enable moving the paper carrier to such positions under the opening 6 in order to make the desired prints on a sheet of 8" x 10" paper positioned on the paper carrier.

Figure 6:
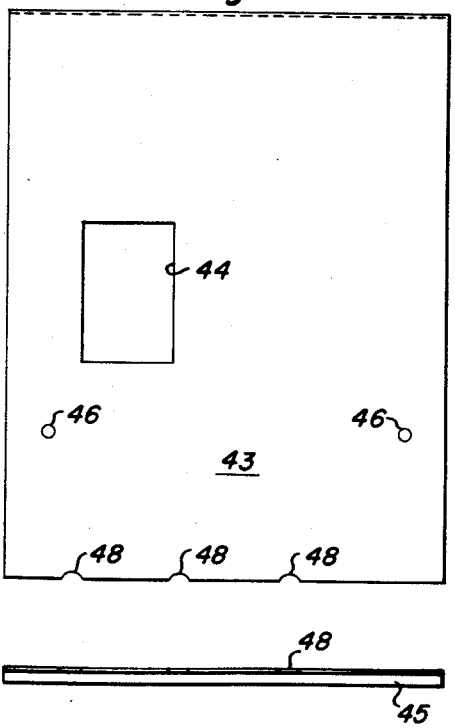
Fig. 6 is a similar view of a mask having an exposure opening for making 2½" x 3½" prints.
Figure 3:
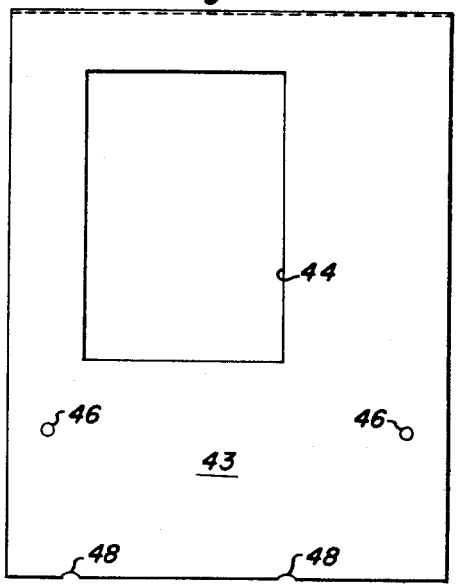
Fig. 3 is a plan view of the mask illustrated in Fig. 2.
Figure 9:
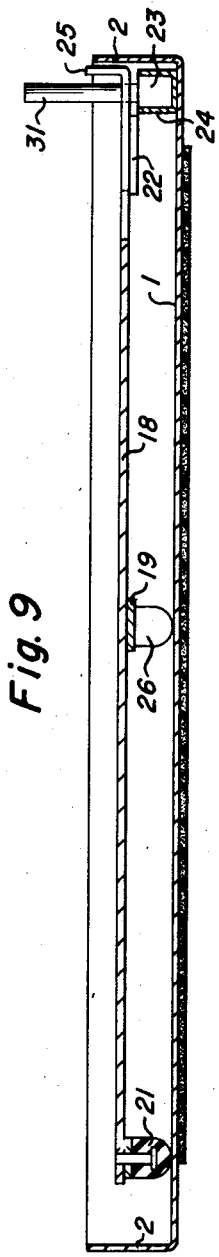
Fig. 9 is a detailed sectional view on line 9—9 of Fig. 8.
Figure 10:
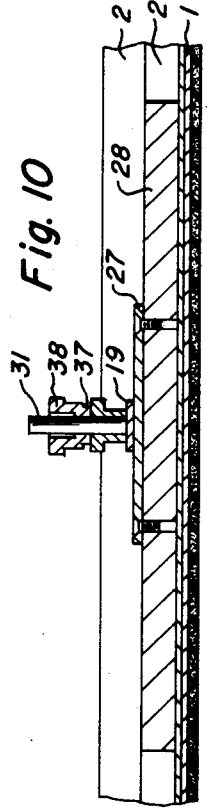
Fig. 10 is a detailed sectional view on line 10—10 of Fig. 8.
Figure 13:
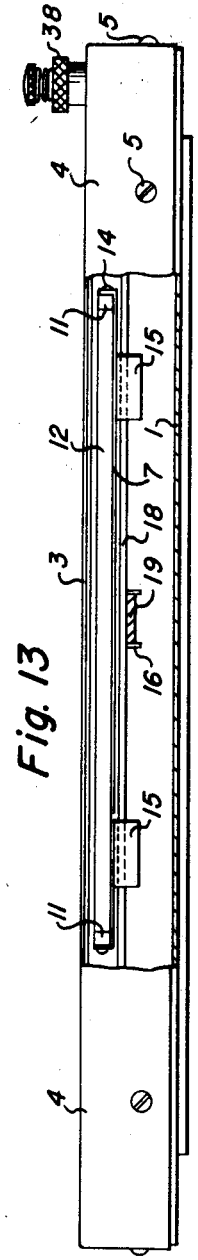
Fig. 13 is a side elevation, partly in section, illustrating the paper carrier located on the positioning blades.
Figure 14:
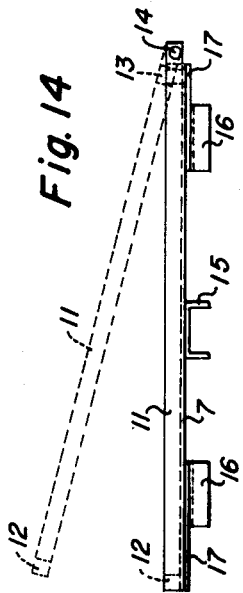
Fig. 14 is a side elevation of the easel.

To accomplish this, the mask having an opening of a size to produce a 2½" x 3½" print, is provided on its lower edge which lies adjacent to the upper edge of the slot 35 with three notches 48 arranged at equal distances from each other as shown, see Fig. 6. Assuming the mask and paper carrier, with the paper in position thereon, to be in initial position, with the spring locking collar and pin at the end of its slot, the paper is exposed and the first print made with the paper in such position. The paper carrier and paper are then moved by lifting the spring locking collar until it clears the mask and is resting on the top surface of the mask, and the spring locking collar and pin can then be moved until the spring collar drops into the first notch 48 of the mask, and the paper carrier and paper are then in position to be exposed and make the second print. Following this, the third print is made by lifting the spring locking collar and moving the pin along until the spring collar drops into the next notch and the third print made on the paper. After completion of the third print, the pin and spring locking collar can be moved until the spring collar drops into the fourth notch and the paper is then in position for making the fourth print, thus completing four prints on the upper half of the paper, following which the pin and spring locking collar in the other slot are operated to the opposite end of the slot in which the pin is mounted, bringing the upper half of the paper into position for making the four prints which occupy the upper half of the sheet. This is accomplished by moving the spring locking collar and pin in the lower slot in a reverse direction to the four previously described positions. The remaining masks are each provided with two notches in their lower edges for cooperation with the spring locking collar that automatically positions the paper carrier in two positions when the pin and spring locking collar are moved endwise of the slot, while the other spring collar and pin are moved endwise of the slot to move the upper positioning blade and the paper carrier to bring the upper half of the paper carrier and paper into position for exposure. The notches provided in the bottom slot 35, spaced from the end of the slot are in position to receive the spring locking collar and locate the paper carrier in its initial position, so that the paper carrier can be placed in the opening in the housing with the paper positioned thereon. The selected mask, depending upon the size of the prints to be made, is then positioned on the housing and the paper carrier moved by the operator without seeing any of the parts, by simply lifting the spring locking collars and moving the pins controlling the positioning blades and paper carrier endwise of their slots. Other masks can be provided with different sized openings and positioned on the housing with notches arranged corresponding to the size of the particular opening in the mask, or the housing can be provided with a different sized opening for the paper carrier to enable utilizing photographic paper of different sizes if desired. A recess 49 is provided along the bottom edge of the opening 6 in the cover to enable readily inserting the paper carrier over the positioning blades or for grasping and removing the paper carrier when necessary to remove the paper carrier.

The structure has the advantage of enabling making any desired number of prints on a conventional sheet of 8" x 10" paper which is especially desirable in making color prints, both for selecting the preferred print from a number, and thereafter printing a given number of duplicate prints on the same sheet of paper, all of which can be accomplished in a dark room with no lighting requirements during the positioning of the paper or masks.

In case it is desired to make prints of different sizes on the same sheet, after completing the first set of prints, the mask is removed and a second mask placed on the cover for making the second set of prints, and a suitable shield is positioned in the opening in the second mask to cover the paper while focussing, after which the shield is removed to make the exposures.

While the invention has been described with reference to the structure shown, it is not limited to the details herein disclosed, and this application is intended to cover such modifications or departures as may come within the purposes of the invention or the scope of the following claim.

I claim:

A photographic easel comprising a housing including a top wall having an opening therein to receive a paper carrier, a pair of positioning blades arranged within the housing perpendicularly of each other and each movable bodily endwise of the other, each of said positioning blades having a shoe at one end, a track secured in the housing extending perpendicularly to said positioning blade, said shoe being movable in said track for guiding its blade bodily endwise of the other blade, said blades being arranged one above the other in contiguous relation, the housing having slots in its top extending perpendicularly to said positioning blades, a pin connected to each positioning blade and extending upwardly through one of said slots, a locking collar movable on said pin, a spring arranged on said pin above the collar and acting to press said collar toward the housing, a retaining screw engaging said pin and retaining said spring against the collar, a mask having an opening therein cooperating with the paper carrier, the mask having a flange at one edge engaging a side wall of the housing, positioning pins on the housing extending above the top surface thereof, the mask having openings engaging said positioning pins, one edge of the mask when the latter is positioned being located in alinement with the adjacent edge of one of said slots and having a plurality of notched openings along said edge, the number of said notched openings depending upon the size of the opening in the mask and the number of positions required for the paper carrier when operated in conjunction with the selected mask, and the locking collar engaging said notched openings at the adjacent edge of the mask and acting automatically to stop movement of the paper carrier when in the predetermined position determined by the locking collar.

References Cited in the file of this patent

UNITED STATES PATENTS

| | | |
|---|---|---|
| 2,498,417 | Haff | Feb. 21, 1950 |
| 2,605,675 | Mourfield | Aug. 5, 1952 |
| 2,823,581 | Greenspan | Feb. 18, 1958 |

FOREIGN PATENTS

| | | |
|---|---|---|
| 944,604 | France | Nov. 8, 1948 |
| 944,877 | France | Nov. 15, 1948 |